United States Patent
Singer et al.

(10) Patent No.: US 7,414,546 B2
(45) Date of Patent: Aug. 19, 2008

(54) WHITE ANTI-COLLISION LIGHT UTILIZING LIGHT-EMITTING DIODE (LED) TECHNOLOGY

(75) Inventors: Jeffrey M. Singer, Fairborn, OH (US); John L. Lundberg, Springfield, OH (US)

(73) Assignee: Honeywell International Inc., Morristown, NJ (US)

( * ) Notice: Subject to any disclaimer, the term of this patent is extended or adjusted under 35 U.S.C. 154(b) by 188 days.

(21) Appl. No.: 11/109,439

(22) Filed: Apr. 19, 2005

(65) Prior Publication Data

US 2006/0007013 A1    Jan. 12, 2006

Related U.S. Application Data

(60) Provisional application No. 60/585,858, filed on Jul. 8, 2004.

(51) Int. Cl.
*G08G 5/04* (2006.01)
(52) U.S. Cl. ................... 340/961; 340/815.45; 340/981; 362/470
(58) Field of Classification Search ......... 340/971–983, 340/815.45; 315/185 R, 165 R; 362/327, 362/470
See application file for complete search history.

(56) References Cited

U.S. PATENT DOCUMENTS

| | | | |
|---|---|---|---|
| 5,585,783 A | 12/1996 | Hall | |
| 5,929,788 A | 7/1999 | Vukosic | |
| 5,984,494 A | 11/1999 | Chapman et al. | |
| 6,106,137 A * | 8/2000 | Adams et al. | 362/237 |
| 6,244,728 B1 * | 6/2001 | Cote et al. | 362/249 |
| 6,292,901 B1 | 9/2001 | Lys et al. | |
| 6,456,205 B1 | 9/2002 | Russell et al. | |
| 6,507,290 B1 | 1/2003 | Lodhie et al. | |
| 6,559,777 B1 * | 5/2003 | Martin et al. | 340/981 |
| 6,667,582 B1 * | 12/2003 | Procter | 315/185 R |
| 6,758,586 B1 | 7/2004 | Wilhem et al. | |
| 6,964,507 B2 * | 11/2005 | Mohacsi | 362/545 |
| 7,021,801 B2 | 4/2006 | Mohacsi | |
| 7,186,010 B2 * | 3/2007 | Coushaine et al. | 362/547 |
| 2002/0105432 A1 | 8/2002 | Pederson et al. | |

(Continued)

FOREIGN PATENT DOCUMENTS

WO    WO-03/068599 A1    8/2003

(Continued)

OTHER PUBLICATIONS

Honeywell: "Introducing Honeywell Astreon Solid State Lighting for Business Aircraft," Honeywell Lighting & Electronics, No. EXT-7007, Oct. 2003, XP002322009.

*Primary Examiner*—George A Bugg
*Assistant Examiner*—Hoi C Lau
(74) *Attorney, Agent, or Firm*—Black Lowe & Graham PLLC

(57) ABSTRACT

A white anti-collision light mounted on an aircraft utilizes a set of high-power light-emitting diodes (LEDs) and dedicated reflectors to distribute the light in a particular pattern that satisfies predetermined intensity requirements along a horizontal coverage area. The anti-collision light may include heat pipes for transferring heat from the LEDs to a set of cooling fins. Also, the LEDs may be electrically connected and controlled to provide redundancy and mitigate the effects of LED failures.

22 Claims, 9 Drawing Sheets

U.S. PATENT DOCUMENTS

| | | | |
|---|---|---|---|
| 2003/0058653 A1* | 3/2003 | Konicke et al. | 362/470 |
| 2004/0208018 A1* | 10/2004 | Sayers et al. | 362/544 |
| 2005/0030754 A1* | 2/2005 | Licht | 362/433 |
| 2005/0047167 A1* | 3/2005 | Pederson et al. | 362/542 |
| 2005/0110649 A1* | 5/2005 | Fredericks et al. | 340/815.45 |
| 2005/0122727 A1* | 6/2005 | Machi et al. | 362/470 |
| 2005/0128759 A1* | 6/2005 | Fredericks et al. | 362/470 |
| 2005/0146875 A1* | 7/2005 | Klein | 362/253 |
| 2005/0201112 A1* | 9/2005 | Machi et al. | 362/470 |
| 2005/0225452 A1* | 10/2005 | Stephens et al. | 340/815.45 |
| 2006/0238368 A1* | 10/2006 | Pederson et al. | 340/815.45 |

FOREIGN PATENT DOCUMENTS

| | | |
|---|---|---|
| WO | WO-2004/000645 A1 | 12/2003 |
| WO | WO-2004/007241 A2 | 1/2004 |

* cited by examiner

WHITE ANTI-COLLISION LIGHT UTILIZING LIGHT-EMITTING DIODE (LED) TECHNOLOGY

CROSS-REFERENCES TO RELATED APPLICATIONS

This Non-provisional application claims priority under 35 U.S.C. § 119(e) on U.S. Provisional Application No. 60/585,858 filed on Jul. 8, 2004, the entire contents of which are hereby incorporated by reference. This application is related to U.S. patent application Ser. No. 11/035,365, entitled "BODY MOUNTED LED-BASED ANTI-COLLISION LIGHT FOR AIRCRAFT," which was filed on Jan. 13, 2005, the entire contents of which are hereby incorporated by reference.

FIELD OF THE INVENTION

The present invention is directed to aircraft anti-collision lights and, more particularly, to anti-collision lights utilizing light-emitting diodes (LEDs) that are mounted on the wingtips and/or tail of an aircraft.

BACKGROUND

The Federal Aviation Regulation (FAR) requirements for minimum effective intensities for an anti-collision light system are shown in FIG. 1. The illustrated coverage may be satisfied by multiple light installations, provided that each light meets the required photometric specification for its respective area. Typically, each red fuselage anti-collision light will cover either the upper or lower portion of the specification, while the white anti-collision lights will cover specific horizontal sections (e.g., wingtip anti-collision lights will have 110-degree coverage each and the aft light will cover the remaining 140 degrees).

Conventional white anti-collision lights utilize Xenon flash tube technology. However, anti-collision lights using high-power LEDs are advantageous because of their longer lives, lower power consumption, and reduced weight (because a separate power supply is not needed) compared to Xenon-based systems.

SUMMARY OF THE INVENTION

Exemplary embodiments of the present invention are directed to an aviation white anti-collision light, which is mounted to the aft and/or wingtips of an aircraft and utilizes a plurality of light-emitting diodes (LEDs).

According to an exemplary embodiment, an anti-collision light may utilize LEDs in conjunction with dedicated reflectors to achieve the distribution required by Federal Aviation Regulations (FARs) for the white anti-collision light. The reflectors may be designed to redistribute light from the LEDs into a pattern that satisfies the photometric distribution specified in the FARs.

The use of such reflectors may help reduce the number of LEDs used in the anti-collision device, as compared to other types of LED-based anti-collision lights that utilize a "brute force" optical approach. Using less LEDs may reduce costs and power consumption, while simplifying thermal management.

According to an exemplary embodiment, the white anti-collision light has a thermal design for maintaining the junction temperature of the LEDs at an acceptable level. In an exemplary embodiment, the thermal design may use heat pipes for transferring heat from the LEDs to a set of "remote" cooling fins.

According to an exemplary embodiment, the white anti-collision light utilizes flashing LEDs.

According to an exemplary embodiment, the status of the LEDs in the white anti-collision light is monitored to determine whether the light is meeting FAR photometric requirements. In an exemplary embodiment, the electrical control system is designed to detect an LED failure mode, which may cause the anti-collision light not to meet the photometric requirements. The electrical control system may further be designed to shut off the anti-collision light in response to detecting such a failure mode.

In a further embodiment, a system of multiple (e.g., three) white anti-collision lights may be installed on the same aircraft, each utilizing a common light head that provides sufficient coverage to allow the system of anti-collision lights to satisfy the intensity requirements of the FARs 360 degrees along the aircraft's horizontal plane.

Further advances in scope of applicability of the present invention will become apparent from the detailed description provided hereinafter. However, it should be understood that the detailed description and specific embodiments therein, while disclosing exemplary embodiments of the invention, are provided by way of illustration only.

DETAILED DESCRIPTION OF EXEMPLARY EMBODIMENTS

Exemplary embodiments of the present invention are described in the following description.

Figure 1:
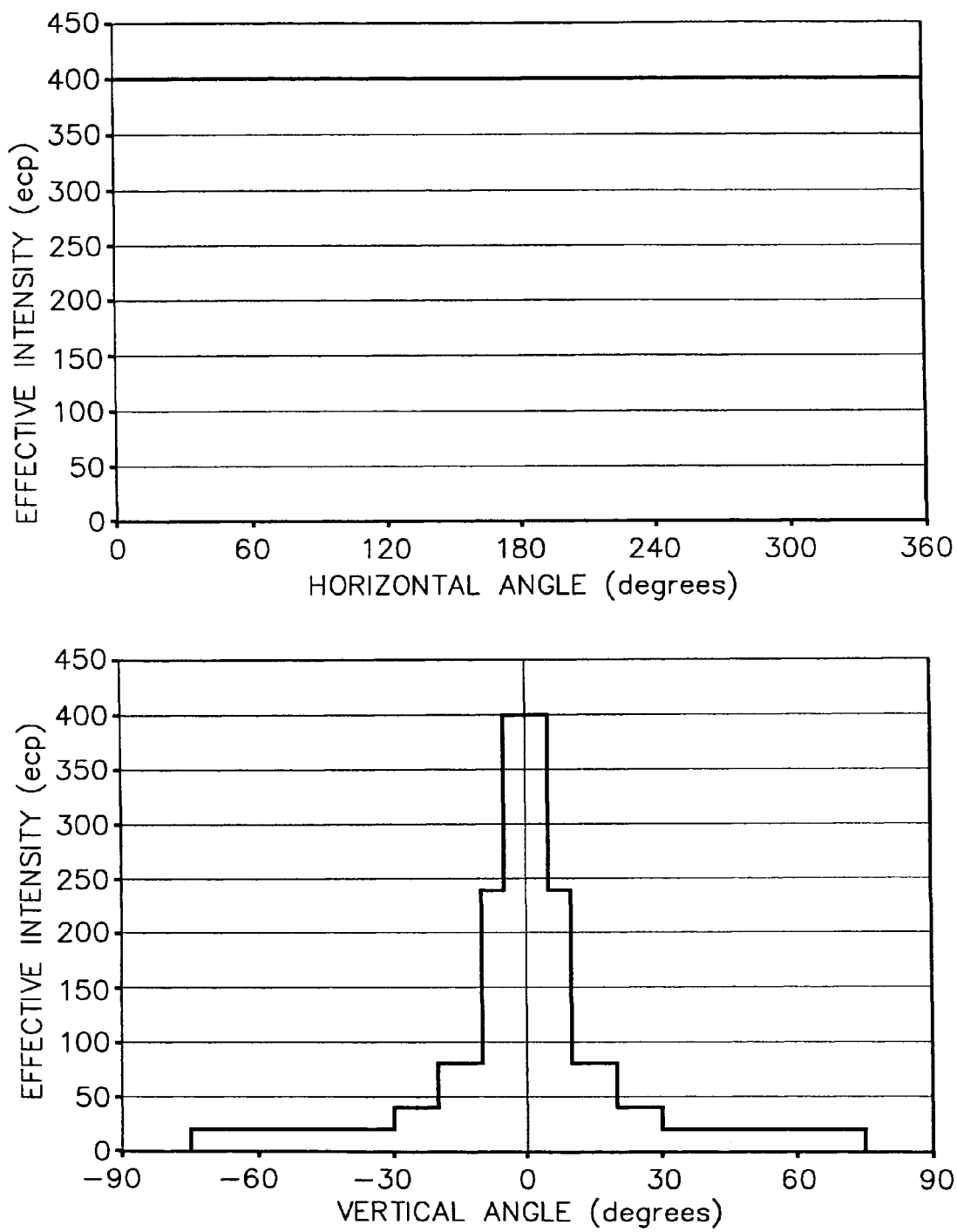
FIG. 1 illustrates photometric requirements of the Federal Aviation Regulations (FARs) for an aircraft anti-collision light system.
Figure 2A:
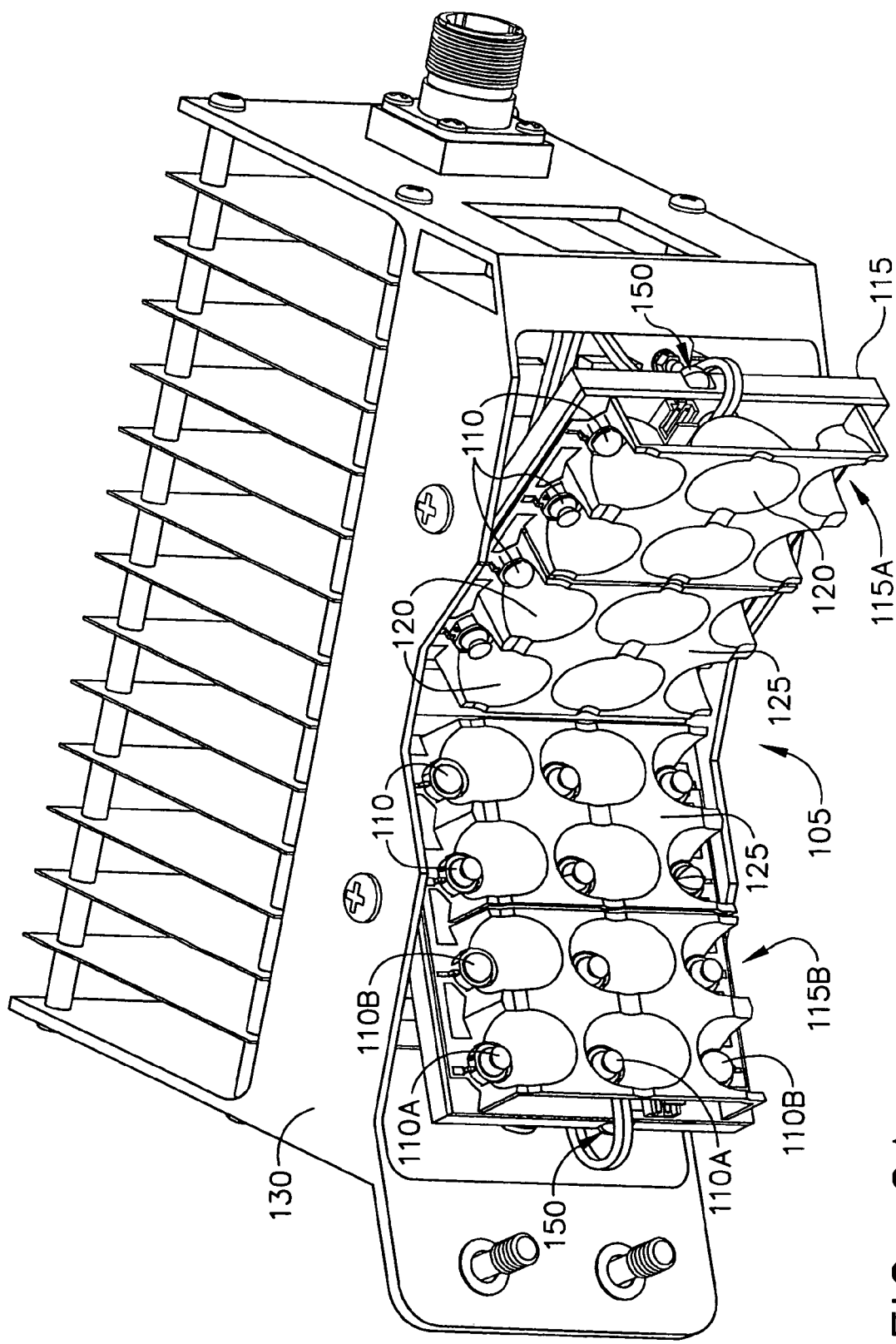
FIG. 2A illustrates a perspective view of a white anti-collision light, according to an exemplary embodiment of the present invention.

FIG. 2A illustrates a perspective view of a white anti-collision light 100, according to an exemplary embodiment of the present invention. As shown in FIG. 2A, the anti-collision light 100 may include a mounting plate 115 (e.g., an aluminum plate) on which high-power aviation white LEDs 110 are mounted. Each LED 110 may have a dedicated spline-based reflector 120.

According to an exemplary embodiment, the reflectors 120 may be manufactured into reflector blocks 125. The reflector blocks 125 may be incorporated into the white anti-collision light 100 as an injection molded-part. As such, the reflectors 120 may be made of a plastic material; which is vacuum-metalized in order to obtain the requisite reflective qualities.

However, it should be noted that the dedicated reflectors 120 may be manufactured in alternative ways. For example, the reflectors 120 may be "machined" into metallic (e.g., aluminum) reflector blocks 125. In such an embodiment, the metallic material of each reflector block 125 may provide the necessary reflective qualities. In another alternative embodiment, each dedicated reflector 120 may comprise individual units, which are made of vacuum-metalized plastic or a metallic material, each being separately mounted on or connected to the mounting plate 115 without reflector blocks 125.

It will be readily apparent to those of ordinary skill in the art the various ways that the dedicated reflectors 120 may be implemented into the white anti-collision light 100 without departing from the spirit and scope of the invention.

In the exemplary embodiment of FIG. 2A, four reflector blocks 125 are mounted on the mounting plate 115, and six reflectors 120 are implemented into each reflector block 125, in order to provide a dedicated reflector for each of the 24 LEDs 110.

As shown in FIG. 2A, the mounting plate 115 provides a pair of mounting surfaces 115A and 115B on which the LEDs 110 and reflector blocks 125 are mounted. Each of the mounting plates 115A, 115B may provide a particular orientation to the LEDs 110 and reflectors 120 mounted thereon. For example, each mounting surface 115A, 115B is disposed at a particular angle with respect to the longitudinal axis of the aircraft (i.e., the "axis of symmetry" of the aircraft). Each of the LEDs 110 on a particular mounting surface 115A, 115B may be oriented at the same angle with respect to the aircraft's longitudinal axis.

Although the embodiment illustrated in FIG. 2A shows a single "V-shaped" mounting plate 115, it will be readily apparent to those of ordinary skill in the art that two separate mounting plates 115 may be implemented, each providing a respective one of the mounting surfaces 115A and 115B.

In this specification, the portion of the anti-collision light 100 that includes the LEDs 110, reflectors 120 and reflector blocks 125, and the mounting plate 115 may collectively be referred to as the "light module" 105.

Referring again to FIG. 2A, the white anti-collision light 100 may also include an outer housing 130 to which the other various components of the light 100 are attached. The housing 130 may be used for mounting the anti-collision light 100 to the aircraft. Also, a series of cooling fins 140 may be connected to the housing 130 as part of a thermal management system that dissipates heat from various components in the anti-collision light 100 (e.g., LEDs 110).

Figure 2B:
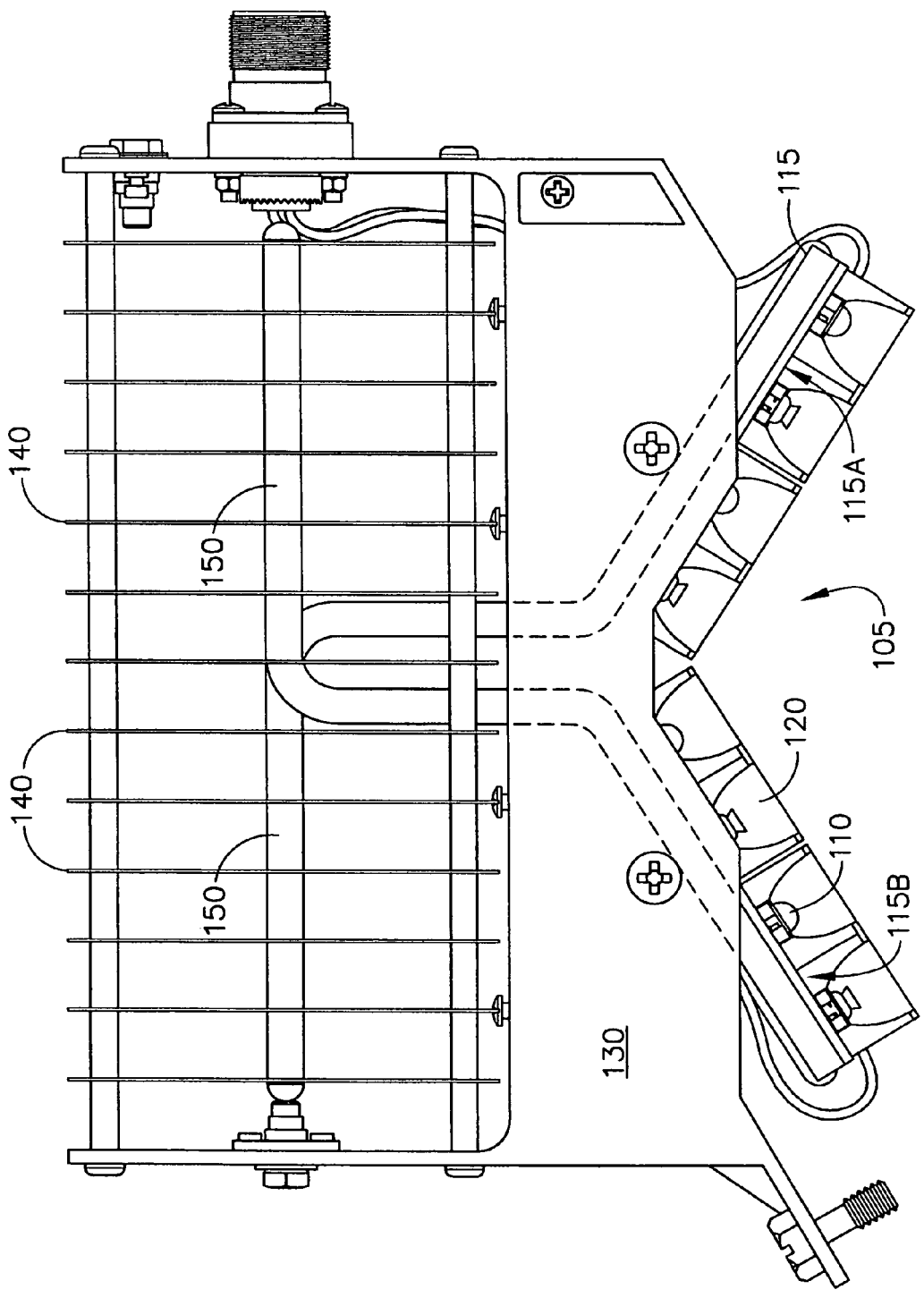
FIG. 2B illustrates a top view of a white anti-collision light, according to an exemplary embodiment of the present invention.

FIG. 2B illustrates a top view of the white anti-collision light 100. According to an exemplary embodiment, a pair of heat pipes 150 is utilized to transfer heat from the LEDs 110 in light module 105 to the cooing fins 140. Also, in FIG. 2B, the portion of each heat pipe 150 covered by the housing 130 is illustrated by dotted lines.

Figures 5A, 5B:
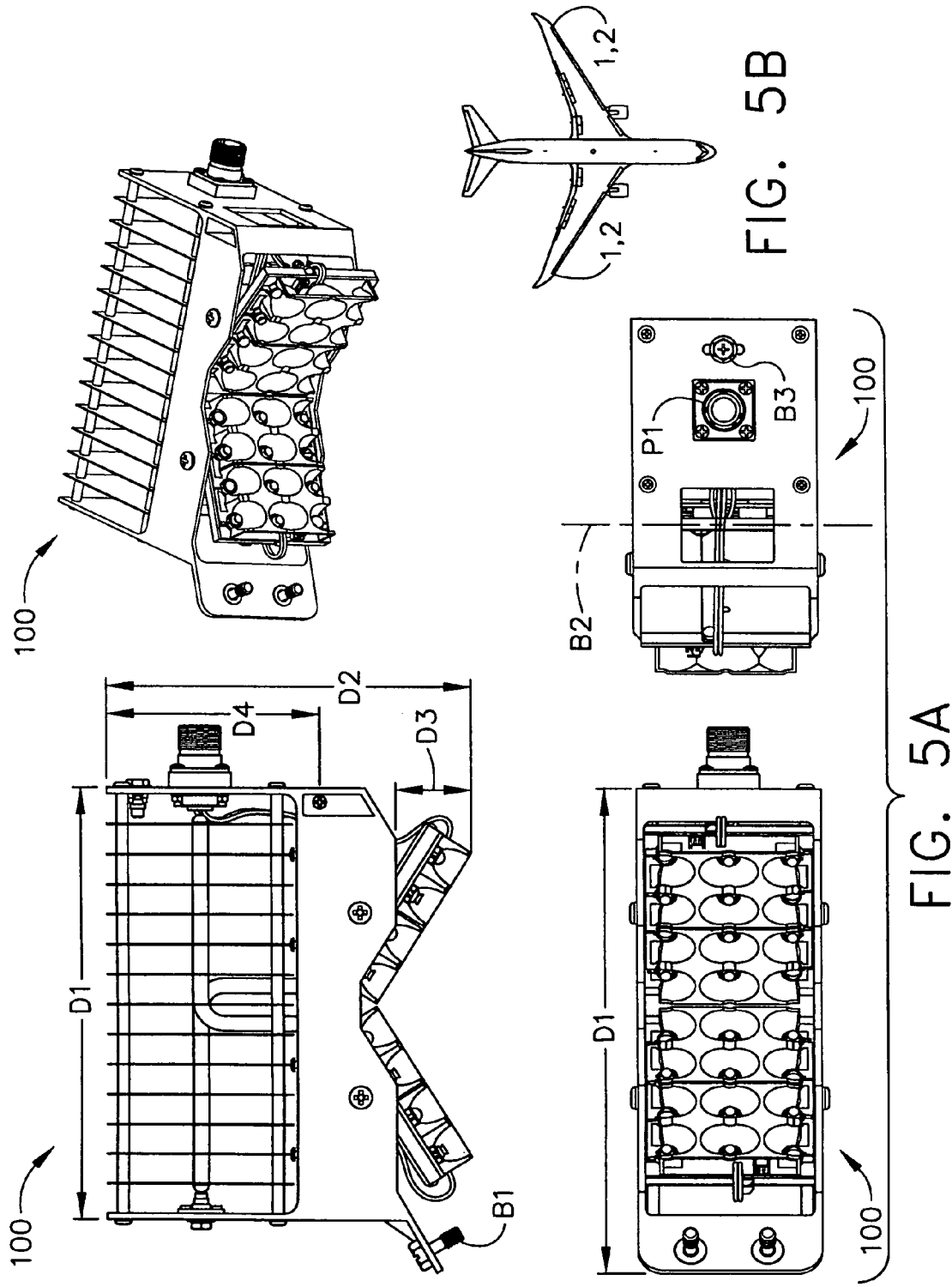
FIG. 5A illustrates a configuration and bolt pattern for mounting a white anti-collision light to an aircraft, according to an exemplary embodiment.
FIG. 5B illustrates wingtip locations on an aircraft for mounting white anti-collision lights, according to an exemplary embodiment.

According to an exemplary embodiment, the packaging of the anti-collision light 100 offers the possibility of retrofit and forward fit by maintaining a mounting scheme and bolt pattern that is similar to existing white anti-collision lights utilizing Xenon bulb flash tubes. FIG. 5A illustrates such a mounting scheme and bolt pattern for installations of the white anti-collision light 100.

Specifically, FIG. 5A provides various views of the anti-collision light 100 in order to illustrate various dimensions D1-D4 and placement of bolts B1-B3. Also, this figure illustrates the placement of a power input terminal P1. According to an exemplary embodiment, the dimensions D1-D4 and the location of bolts B1-B3 and power input terminal P1 may be designed so that the white anti-collision light 100 will be compatible with the mounting platform of existing Xenon-based anti-collision lights.

Figure 6A:
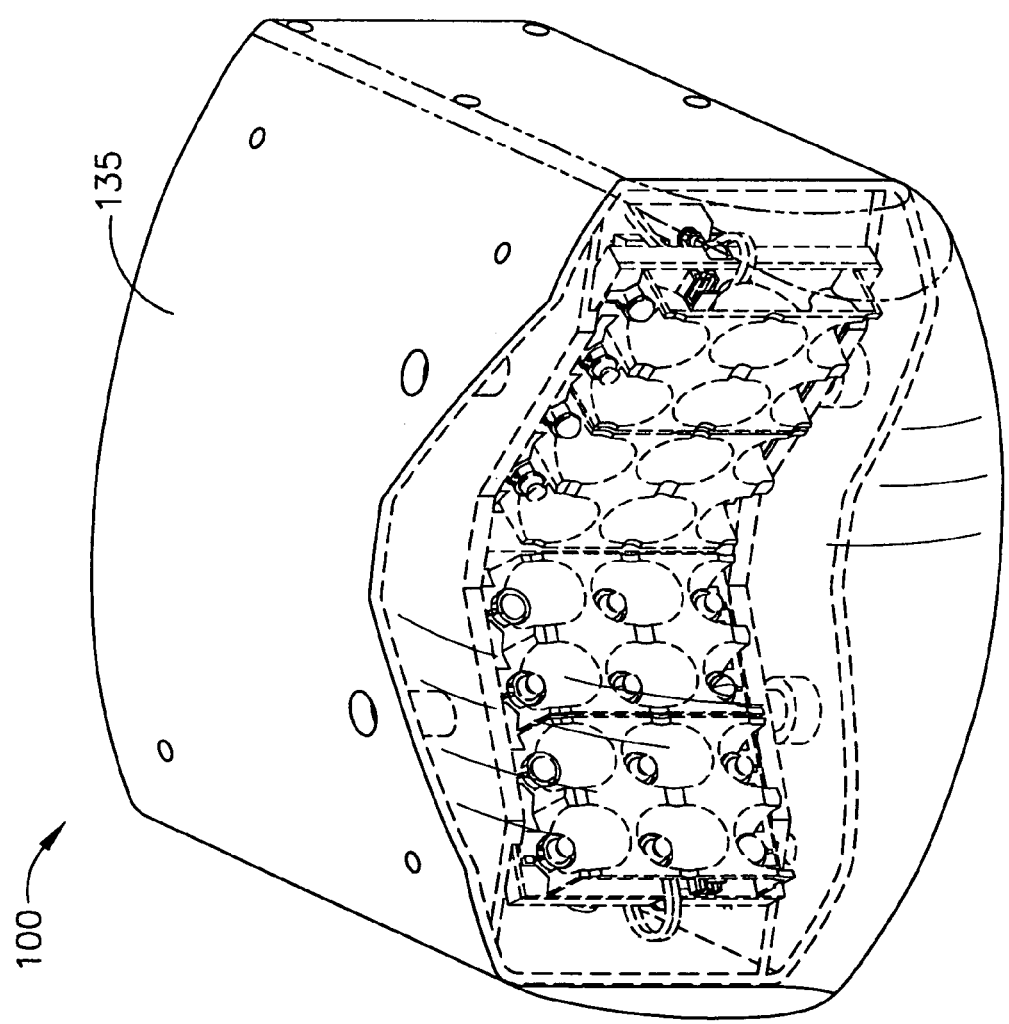
FIG. 6A illustrates a white anti-collision light with an outer casing, according to an exemplary embodiment of the present invention.

FIG. 6A illustrates a further exemplary embodiment in which the anti-collision light 100 includes an outer casing 135 in addition to the housing 130. The outer casing 135 may used for providing additional protection against the operating environment. For example, a white anti-collision light 100 installed at the aft of the aircraft may be exposed to more severe operating parameters (e.g., hazardous fluids such as Skydrol®). Therefore, in an exemplary embodiment, the outer casing 135 may be implemented in the anti-collision light 100 installed at the aft of the aircraft.

According to an exemplary embodiment, the white anti-collision light 100 may be designed and built so as not to exceed the weight of existing white anti-collision lights using Xenon tube technology. This helps ensure that the anti-collision light 100 may be used as a replacement for existing Xenon anti-collision lights without requiring significant modification either to the white anti-collision light 100 itself, or to the relevant mounting platform on the aircraft designed for a Xenon-based light. According to such an embodiment, the white anti-collision light 100 may be considered a direct replacement for such Xenon-based white anti-collision lights.

Although the light 100 illustrated in FIGS. 2A and 2B has been described above as an aviation white anti-collision light, the present invention is not thus limited. Alternative exemplary embodiments contemplate an aviation red anti-collision light 100 having the configuration illustrated in attached figures and operating according to principles described in this detailed description. Other exemplary embodiments contemplate an anti-collision light 100 configured to emit infrared (IR) light. For instance, such an anti-collision light 100 may be configured to operate in dual modes—visible and IR—as will be explained in more detail below.

A further exemplary embodiment contemplates a position light 100 having a configuration and operating according to principles described in this written description and attached figures. Furthermore, an exemplary embodiment of the present invention contemplates a light 100 that may switch between the dual operating modes of anti-collision light and position light. Such an embodiment will be described in more detail below.

Thus, while exemplary embodiments of this present application are described in this application as pertaining to a white anti-collision light 100, the present invention is not limited to such an embodiment and covers the alternative embodiments described above, as well as any other embodiments contemplated by those of ordinary skill in the art that do not depart from the spirit of the present invention.

The operative principles of the white anti-collision light 100, according to an exemplary embodiment, will now be described in connection with FIGS. 2A and 2B. The anti-collision light 100 may be conceptually divided into three major components: 1) the light module 105, which includes the LEDs 110 and reflectors 120; 2) the thermal management system, which includes heat pipes 150 and a series of cooling fins 140; and 3) the outer housing 130.

According to an exemplary embodiment, relatively high-power white LEDs, such as the Luxeon® III LEDs manufactured by Lumileds™, may be implemented as the LEDs 110 in the light module 105. In an exemplary embodiment, 24 LEDs 110 are installed in the light module 105. These LEDs 110 may be configured to emit "aviation white" colored light specified in the Federal Aviation Regulations (FARs). To achieve the color requirements for the white anti-collision lights, binning of the white LEDs may be performed to help ensure compliance throughout the life of the white anti-collision light 100.

According to an exemplary embodiment, the LEDs 110 may include side-emitting LEDs 110A, lambertian LEDs 110B, or a combination of both (as shown in FIG. 2A). In order to illustrate a particular exemplary embodiment, FIG. 2A shows eight lambertian LEDs 110B being utilized in the light module 105 (two in each of the four reflector blocks 125), while the remainder of the LEDs 110 are side-emitting LEDs 110A.

Figure 7:
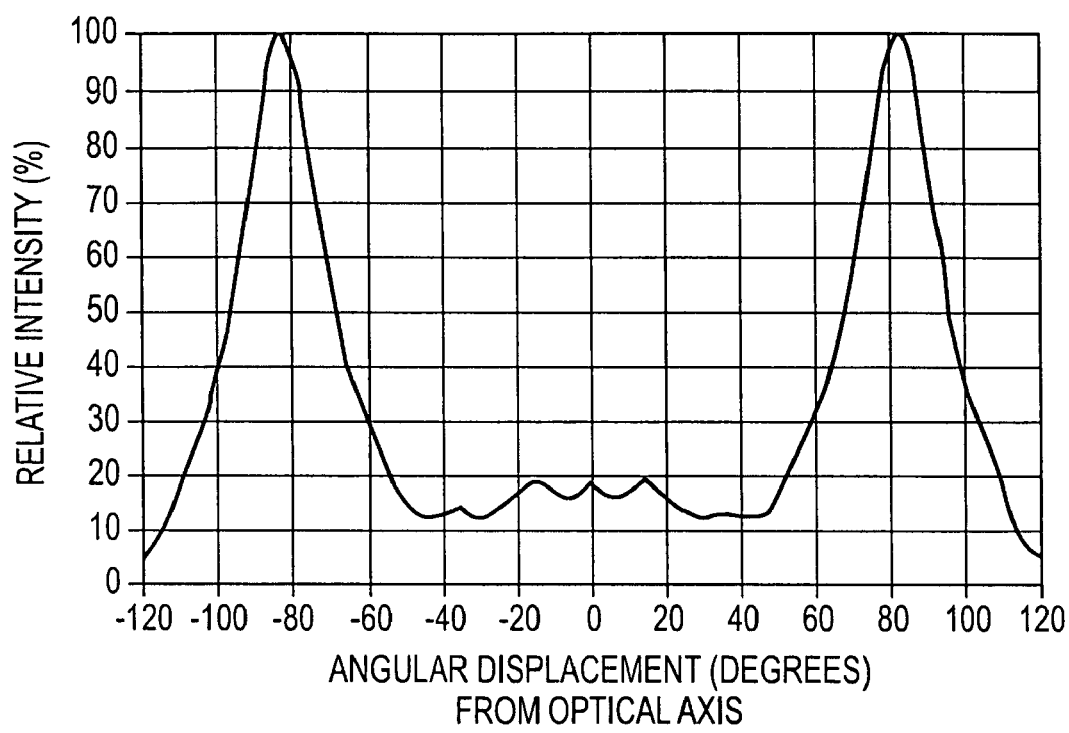
FIG. 7 illustrates a spatial radiation pattern for an exemplary type of side-emitting LEDs

As will be evident from the figures (e.g., FIG. 2A), the light from a side-emitting LED 110A may be directed substantially toward its corresponding reflector 120. For example, LUXEON™ white side-emitting LEDs exhibit a spatial radiation pattern as shown in FIG. 7. As shown in FIG. 7, distribution of maximum intensity is such that, for the 360 deg. around the optical axis of the LED 110A, maximum intensity is achieved in the range of 60-100 deg. off the optical axis. In an exemplary embodiment, the optical axis of each side-emitting LEDs 110A may be oriented so that a portion of the LED's 110A sides directly faces the corresponding reflector 120. Thus, a substantial portion of the 360 deg. distribution of the side-emitting LED's 110A maximum intensity is directed toward the corresponding reflector 120.

While side-emitting 110A and lambertian 110B LEDs are shown in FIG. 2A, other combinations may be implemented for the LEDs 110. For example, the LEDs 110 may all be of the same type. Furthermore, the light module 105 may include LEDs 110 that are neither side-emitting nor lambertian-type. Different combinations and types of LEDs 110 may be used to achieve a desired light distribution pattern, as will be readily contemplated by those of ordinary skill in the art.

As mentioned above, a dedicated spine-based reflector 120 may be provided for each LED 110, according to an exemplary embodiment. For example, as shown in FIGS. 2A and 2B, each spline-based reflector 125 may be injection-molded or machined into reflector block 125. Such reflector blocks 125 may be mounted onto a particular mounting surface 115A, 115B so that its reflectors 120 are positioned next to the corresponding LED 110.

The term "spline-based" means that the contours and shape of the reflector's 120 surface is designed and developed in order to redistribute the light from the corresponding LED 110 into a desired light pattern. The redistributed light pattern will be dependent on factors including the qualities of the reflector's 120 material and the light emitting qualities of the type of LED 110 being used. Taking such factors into account, the contours and shape of each dedicated reflector 120 may be designed using techniques well known to those of ordinary skill in the art.

According to an exemplary embodiment, each dedicated reflector 120 may be designed using a computer-aided design (CAD) software application executed on a computer. Simulation software may also be used to verify the design of the reflectors. However, other methods of designing the reflectors 120 may also be utilized, such as trial-and-error, etc.

Furthermore, each corresponding set of LED 110 and dedicated reflector 120 is given a particular orientation by the mounting surface 115A, 115B on which it is mounted. For instance, the mounting surface 115A, 115B may be configured at a particular angle with respect to the longitudinal axis of the aircraft in order to orient each of its LEDs 110 at that same angle. The orientation of each LED 110 and reflector will affect the particular light distribution pattern.

Accordingly, to ensure that the light module 105 of the white anti-collision light 100 emits a desired pattern of light, each LED 110 and dedicated reflector 120 in the anti-collision light 100 should be set to an appropriate orientation to achieve the desired pattern. Thus, the orientation of each mounting surface 115A, 115B may be determined in conjunction with the design process employed for the spline-based reflectors 120. E.g., the orientation may be determined while executing a CAD application to design the reflectors 120.

According to an exemplary embodiment, the reflectors 120 and mounting surfaces 115A, 115B are designed to redistribute the light into a pattern that more closely matches the specifications in the Federal Aviation Regulations (FARs). Thus, the various components of the light module 105 in the white anti-collision light 100 are designed to satisfy the predetermined intensity requirements specified by the FARs for the anti-collision light's 100 respective coverage area along the horizontal plane corresponding to the aircraft.

Figure 6B:
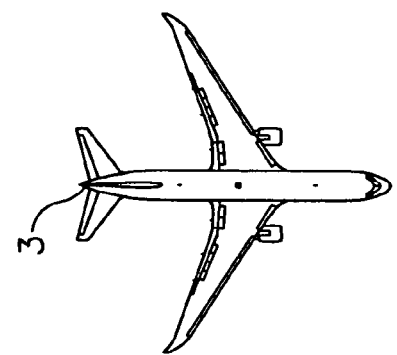
FIG. 6B illustrates an aft location on an aircraft for mounting a white anti-collision light, according to an exemplary embodiment of the present invention.

Thus, in an exemplary embodiment, the reflectors 120 may be configured to redistribute the light output of the white anti-collision light 100 to provide coverage of at least 120 degrees horizontally. Thus, three installations of the white anti-collision light 100 (e.g., one light 100 on the aft, and one light 100 on each wingtip) would meet the 360-degree horizontal coverage required by the FARs for a given aircraft. According to exemplary embodiments, FIG. 5B illustrates the locations of wingtip mountings 1 and 2 of the white anti-collision light 100, while FIG. 6B illustrates the location of an aft mounting 3 of the white anti-collision light 100.

It should be noted that the various modifications may be made to the light module 105 in order to increase or decrease the range of horizontal coverage of a particular one of the white anti-collision lights 100 installed on an aircraft. For instance, the white anti-collision light 100 corresponding to the aft mounting 3 may have a 140-degree horizontal coverage area, while each white anti-collision light 100 corresponding to the wingtip mountings 1 and 2 each have a 110-degree horizontal coverage area. The coverage areas of the various anti-collision light 100 installations of an aircraft may be varied in other ways in order to achieve the FAR-specified intensity requirements 360 degrees around the aircraft.

In this detailed description, exemplary embodiments of the invention are described as utilizing spline-based reflectors 120 that are injection-molded onto the white anti-collision light 100 as vacuum-metalized reflector blocks 125. It will be readily apparent to those of ordinary skill in the art how to injection-mold each dedicated reflector 120 to implement the above-described contours, which are designed (e.g., using CAD technology) to redistribute the light in a desired pattern.

As indicated above, in an alternative embodiment, the dedicated reflectors 120 may be machined into reflector blocks 125. For purposes of this specification, "machining" refers to any process of implementing a reflector 120 into a block of material using any type of machine-operated tool, as will be contemplated by those of ordinary skill in the art. Such processes may be devised to implement the above-described spline-based design.

However, as described above, the present invention is not limited to the use of reflectors 120 that are injection-molded or machined into reflector blocks 125. Other processes for mounting the dedicated reflectors 120 may be used. For instance, reflectors 120 may be individually constructed and mounted onto the mounting plate 115.

Because of the large amount of power being generated by the LEDs 110, and the sensitivity of LEDs 110 to the heat that's generated, exemplary embodiments of the anti-collision light 100 are designed to quickly direct the heat away from the LEDs 110. Such a thermal design is intended to maintain the junction temperature of the LEDs 110 at an acceptable level, despite high operating temperatures. To help achieve this goal, heat pipes 150 may be provided, each having an evaporator embedded in the light module 105 and a condenser embedded in the cooling fins 140. The heat pipes 150 are employed to transfer the heat to the cooling fins 140, which are not connected to the light module 105 (thus, the cooling fins 140 are "remote" from the light module 105).

FIG. 2B shows two heat pipes 150 being used, one per side of the light module 105. In other words, each heat pipe 150 may be disposed in relation to a corresponding one of the mounting surfaces 115A and 115B of mounting plate 115 so as to transfer the heat generated at that mounting surface 115A, 115B to the cooling fins 140. In an exemplary embodiment, the dimensions of the heat pipes 150 may be designed to transfer an amount of heat that corresponds to the overall power that the LEDs 110 are expected to consume. For example, the overall length and diameter of the heat pipes 150, as well as the respective lengths of the evaporator and the condenser in each heat pipe 150, may be designed to achieve the desired heat transfer, as will be readily contemplated by those of ordinary skill in the art.

A more detailed description of an exemplary design for the heat pipes 150 will now be provided. In general, heat pipes are passive, two-phase flow devices that exhibit exceptionally high effective thermal conductivity. The capabilities have been approximated to be one hundred to several thousand times greater than those of an equivalent piece of copper. Typically, heat pipes are constructed of a hollow copper outer envelope and a wick structure that lines the inside wall. The pipe is then evacuated and charged with a working fluid, typically water, and then sealed.

However, it should be noted that the above-described heat pipe configuration is merely provided for illustration and not intended to limit the present invention in any way. For example, the heat pipes 150 in the white anti-collision light 100 may use any materials and design that will be readily contemplated by those of ordinary skill in the art.

The general operation of each heat pipe 150, according to an exemplary embodiment, will now be described. As heat is applied to the surface of the heat pipe 150, the working fluid is vaporized. The area in which this occurs is called the evaporator. The vapor at the evaporator has a greater temperature and pressure than the rest of the heat pipe. This pressure gradient forces the vapor to flow to the cooler regions of the heat pipe. As the vapor condenses on the heat pipe walls, the latent heat of vaporization is transferred to the condenser. The wick structure, through a capillary process, transports the working fluid back to the evaporator section. This cycle is repeated continuously or until no more heat is applied to the evaporator.

Of course, it should be noted that the above description of the operative theory behind the heat pipes 150 is provided for purposes of illustration, and should not be used to limit the present invention. Other types of heat pipes 150, whose operation varies from the above description, may be used without departing from the spirit or scope of exemplary embodiments of the present invention.

Similar to the heat pipes 150, the dimensions and configuration of other elements in the anti-collision light 100 (including the light module 105, housing 130, and cooling fins 140) may be varied in order to achieve desired heat dissipation properties, using design techniques that are known to those of ordinary skill in the art.

Figure 4A:
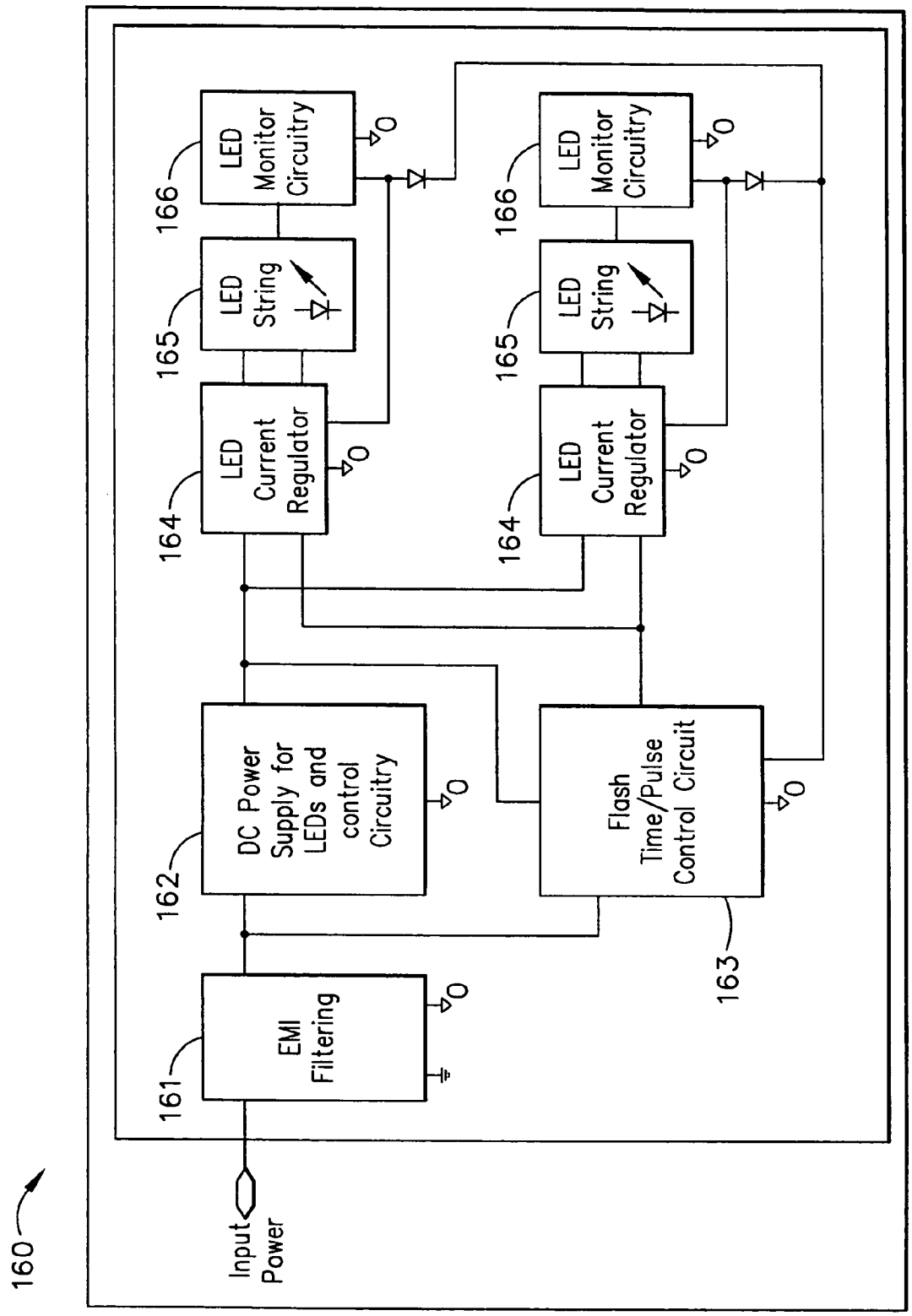
FIG. 4A is a schematic diagram of an electrical control system of a white anti-collision light, according to an exemplary embodiment of the present invention.

FIG. 4A is a schematic diagram of an electrical control system 160 for the white anti-collision light 100, according to an exemplary embodiment. As shown in FIG. 4A, the anti-collision light 100 may be operated directly from a 115 $V_{AC}$, wild frequency (i.e., 370-800 Hz) power source. In an exemplary embodiment, the circuitry in the electrical control system 160 allows for individual LED failures without shutting down the entire light 100, as will be explained below.

According to the exemplary embodiment illustrated in FIG. 4A, the electrical control system 160 is configured to operate the anti-collision light 100 as a strobe light.

As shown in FIG. 4A, DC power supply and control circuitry 162 may be implemented to convert the input power, if necessary, to a DC voltage optimized for the LEDs 110. For instance, the DC power supply and control circuitry 162 may include a switch mode power supply configured to reduce an input 115 $V_{AC}$ wild frequency power to a lower DC voltage optimized for LEDs 110.

As shown in FIG. 4, the LEDs 110 may be electrically grouped into two "strings" 165. Each string 165 may be comprised of 12 LEDs 110 electrically connected in series.

In an exemplary embodiment, the DC power supply and control circuitry 162 may be configured to supply a regulated DC voltage of approximately 50 $V_{DC}$ to supply the current regulator 164 for each of the LED strings 165. Optimizing the amplitude of DC voltage used for the current regulator circuits 164 can maximize circuit efficiency. Each LED current regulator circuit 164 may be configured to keep LED currents at levels, which maximize LED life at the operating intensity.

Referring to FIG. 4A, the electrical control system 160 may include an EMI filter 161 to reduce the audio and radio frequency emissions that can be created by a switch mode power supply and load surges inherent in a strobe system. Both common mode and differential mode filtering may be used, as necessary, to minimize emissions and susceptibility.

The flash timer/pulse control circuit 163 in FIG. 4A may be used to control the flashing of the LEDs 110. According to an exemplary embodiment, the flash rate of each LED 110 may be set at 46 flashes (+/−5 flashes) per minute. In such an embodiment, the duration of the flash may be set to 300 milliseconds (mSec), which corresponds to a nominal duty cycle of 23%. Such an embodiment may be advantageous for use with Luxeon III LEDs.

It should be noted, however, that other appropriate flash rates and duty cycles may be used in alternative embodiments. For example, the flash rate may be determined to allow the anti-collision light 100 to meet photometric requirements of the FARs, when different types of LEDs are used. Also, when the light 100 employs different configurations, and/or alternative types of LEDs, other power dissipation considerations may be taken into account to determine the appropriate flash rate and duty cycle. In addition, the thermal operating conditions of the white anti-collision light 100 may be taken into account in determining the optimal flash rate and duration.

In a further exemplary embodiment, the flash timer/pulse control circuit 163 may be configured to adjust the flash timing in accordance with the photometric requirements of the white anti-collision light 100, the thermal requirements (e.g., operating temperature), or a combination thereof.

As previously mentioned, the LEDs 110 may be electrically grouped into two strings or arrays. For example, the white anti-collision light 100 may contain two strings 165 of 12 LEDs 110. All 12 LEDs 110 in a given string 165 may be wired in series, and a current regulator 164 may be provided for each string 165. This approach simplifies the regulation of current in the LEDs 110 while maintaining current regulation in each LED 110 for maximum operational life. Dividing the electronic control into sections also increases the effective redundancy of the light sources.

While FIG. 4A illustrates the LEDs 110 as being grouped into two strings 165, this is merely illustrative. In alternate exemplary embodiments, the LEDs 110 may be grouped into another number of strings 165, as will be readily contemplated by those of ordinary skill in the art.

According to an exemplary embodiment, the arrangement of LED strings 165 is designed to meet photometric performance requirements of the FARs when one of the LEDs 110 has failed in each of the two strings 165 of FIG. 4A. Accordingly, the anti-collision light 100 can continue operating when up to two of the LEDs 110 have failed, given that the failed LEDs 110 are in different strings 165. Thus, this embodiment provides optical redundancy to mitigate the risk of LED failure.

To implement such risk mitigation, the electrical control system 160 may include LED monitor circuitry 166 for each LED string 165, as shown in FIG. 4A. The LED monitor circuitry 166 is configured to shut off the anti-collision light 100 if two of the LEDs 110 in any one string 165 have failed. In other words, the LED monitor circuitry 166 of the control system 160 is designed to keep the light on as long as no more than one LED 110 in a given string 165 has failed.

Thus, the above embodiment of the white anti-collision light 100 may withstand a failure of two LEDs 110—one LED in each of the two strings 165—before it is determined that the light fails to meet photometric requirements and shuts off. On the other hand, a failure of only two LEDs 110 in the same string 165 may cause the LED monitor circuitry 166 to shut the anti-collision light 100 down, according to this embodiment.

According to a further exemplary embodiment, the LED monitor circuitry 166 contains an LED sensing circuit (not shown) to monitor the voltage drop across each LED 110 in the corresponding string 165. LEDs failures can be caused by either a shorted or open circuit condition. Thus, the LED sensing circuit (not shown) may be designed to detect failures by detecting both short circuit and open circuit conditions for each given LED.

Also, the LED monitor circuitry 166 may be configured to provide an alternate current path for the remaining LEDs 110 in the corresponding string 165, when an LED 110 has failed due to an open condition. The alternate path may allow the anti-collision light 100 to continue to operate, in accordance with the above LED failure algorithm, even when an open condition causes an LED failure.

Figure 4B:
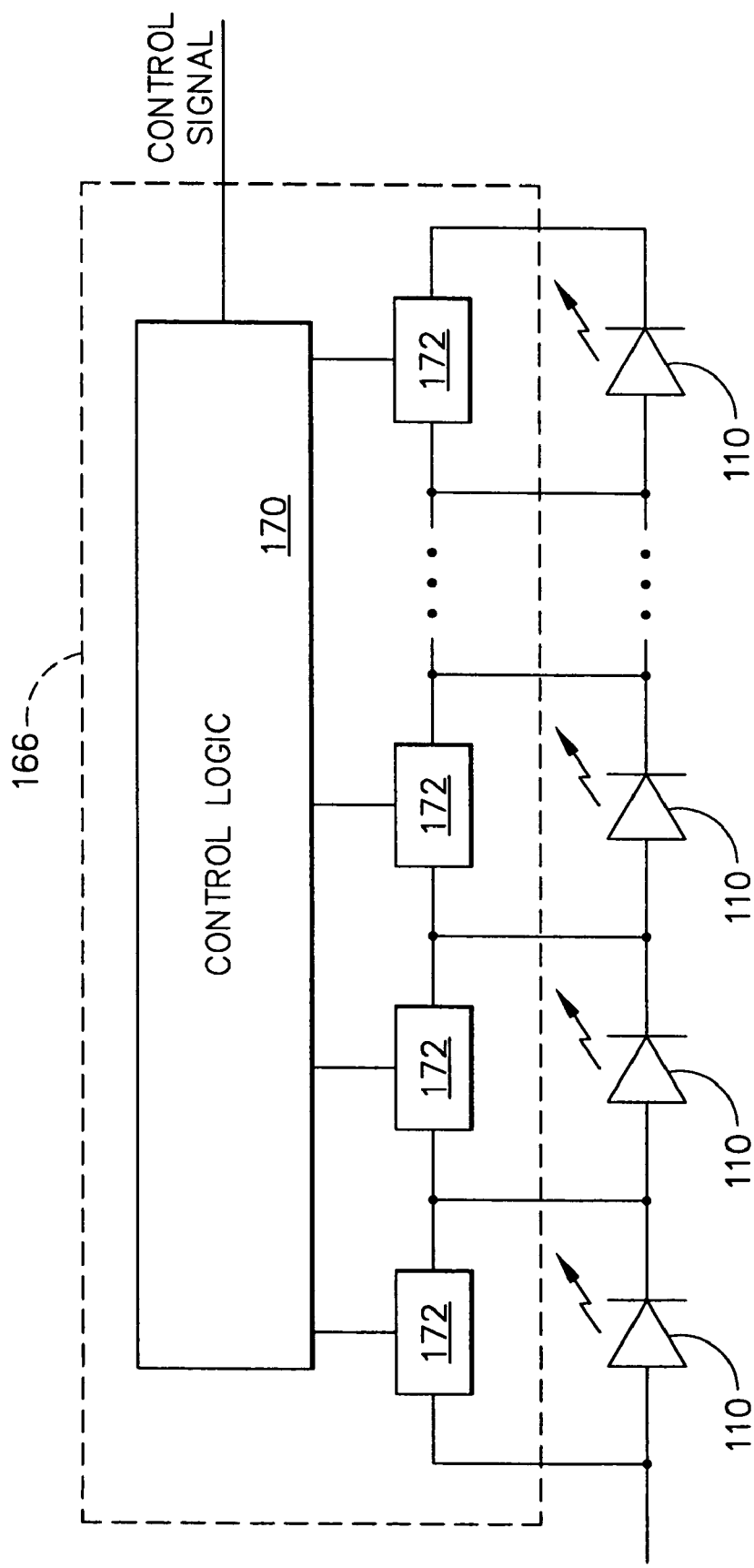
FIG. 4B is a schematic diagram illustrating LED monitor circuitry, which includes LED sensing circuits, according to an exemplary embodiment.

FIG. 4B illustrates a configuration of the LED monitor circuitry 166, which implements LED sensing circuits 172, according to an exemplary embodiment. As shown in this figure, the LED monitor circuitry 166 may include LED sensing circuits 172 to monitor the voltage drop across each LED 110 in the string 165. The results of the LED sensing circuit 172 is reported to control logic 170, which determines whether a fault condition has occurred that requires shutdown of the white anti-collision light 100 (i.e., more than a predetermined number of LEDs 110 in either string has failed). If such a fault condition has occurred, the control logic 170 may output a control signal that either shuts down operation of the light 100, generates the appropriate warning signals that the fault condition has occurred, or both. For purposes of this application, "logic" refers to hardware (e.g., logic circuits, a processor, or a combination thereof), software, or a combination of hardware and software.

Furthermore, although FIG. 4B illustrates a separate LED sensing circuit 172 for each LED 110 in the string 165, it will be readily apparent that the functions of LED sensing circuits 172 may be implemented in a single physical device, separate physical devices, or any combination thereof. It should also be recognized that the LED sensing circuits 172 may be integrated within the same physical device as the control logic 170, or as physically separate units.

In a further exemplary embodiment, the LED monitor circuitry 166 for a given string 165 provides an alternate current path for each LED 110 in the string 165. For example, referring FIG. 4B, the alternate current path may be the path established by one or more LED sensing circuits 172. The alternate current path may allow the white anti-collision light 100 to continue to operate in accordance with the above-described LED failure algorithm even when an LED 110 fails due to an open condition.

It should be noted that the illustrations of in FIGS. 4A and 4B should not be considered limiting as to the LED monitor circuitry 166 for each LED string 165. The invention covers any and all variations that will be readily apparent to those of ordinary skill in the art. For example, in alternative exemplary embodiments, the LED monitor circuitry 166 for multiple strings 165 may be combined into a single physical unit or device.

According to an exemplary embodiment, the anti-collision light 100 includes strings 165 of aviation white LEDs 110 in order to function as a white anti-collision light. However, it should be noted that an alternative exemplary embodiment may include strings 165 of aviation red LEDs 110, thus allowing the anti-collision light 100 to operate as a red anti-collision light. Furthermore, it will be readily apparent to those of ordinary skill in the art that the anti-collision light 100 may include a combination of white and red LEDs 110, thereby allowing the anti-collision light 100 to switch between white light and red light operating modes.

For example, the electrical control system 160 illustrated in FIG. 4A may be modified to include two strings 165 of white LEDs 110 and two strings of red LEDs 110 (not shown). Furthermore, a control mechanism in the DC power supply and control circuitry 162 may be configured to choose whether power is applied to the white or red LED strings 165. In such an embodiment, LED monitor circuitry 166 may be connected to each of the white and red LED strings 165 to implement the optical redundancy described above in relation to FIGS. 4A and 4B for both white and red operating modes.

In an alternative exemplary embodiment, the anti-collision light 100 may be configured for dual-mode operation corresponding to a visible mode and a covert mode. For instance, the LEDs 110 may include a combination of visible (aviation white or red) LEDs and IR LEDs. In such an embodiment, the anti-collision light 100 may include multiple strings 165 of LEDs emitting visible light and multiple strings 165 of IR LEDs. The DC power supply and control circuitry 162 may be configured to switchably apply power to either the visible LED strings 165 or the IR LED strings 165 based on the chosen operating mode. Also, the LED monitor circuitry 166 may be used to provide optical redundancy for both visible and IR modes.

According to another exemplary embodiment, an aircraft-mounted light 100 may be configured to switchably operate as an anti-collision light and as a position light. For example, consider an aft installation of the light 100 whose configuration of LEDs 110 and dedicated reflectors 120 is described in this detailed description and illustrated in attached figures. Such a light 100 may be used to satisfy the FAR requirements for both an aft anti-collision light and aft position light, merely by varying the amount of current supplied to the LED strings 165.

For instance, when the aircraft-mounted light 100 operates as a flashing anti-collision light, the LEDs 110 may be supplied pulses of relatively high current from the DC power supply and control circuitry 162. Alternatively, when the light 100 is operating in a position light mode, the LEDs 110 may be supplied a low constant current by the DC power supply and control circuitry 162. In such an embodiment, the flash timer/pulse control circuit 163 may be disabled from causing the LEDs 110 to flash while operating in the position light mode.

Figure 3:
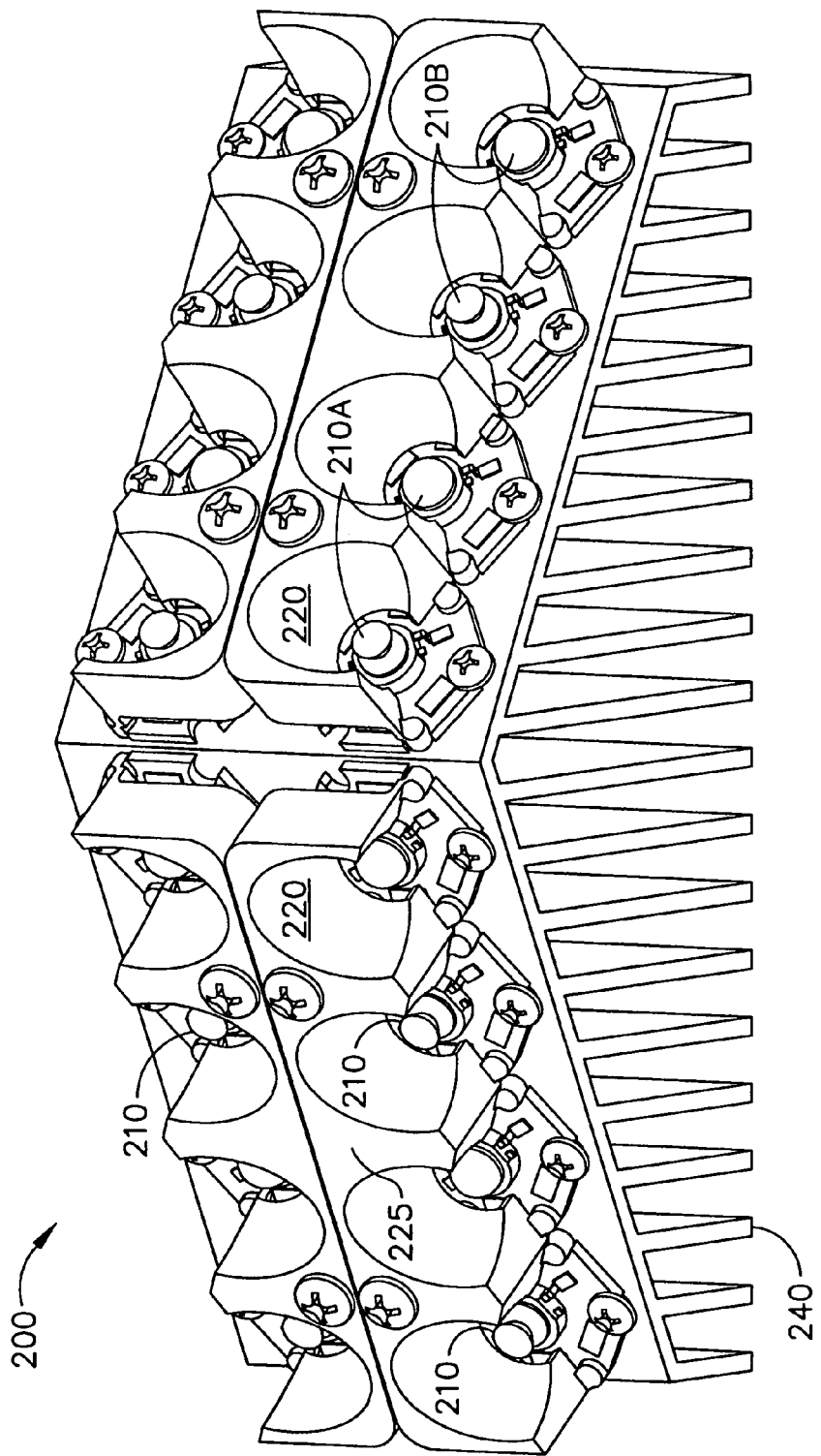
FIG. 3 illustrates a white anti-collision light, according to an alternate exemplary embodiment of the present invention.

FIG. 3 illustrates a white anti-collision light 200, utilizing an alternate configuration. The shape of the light module, and the number of LEDs 210 used therein, may differ with respect to above described embodiments. According to such alternate embodiments, the light 200 may be designed to provide different areas of coverage.

For example, FIG. 3 shows an alternate exemplary embodiment in which 16 LEDs 210 and dedicated reflectors 220 used. In such an embodiment, the groups of four reflectors 220 are machined into only four reflector blocks 225. These reflector blocks may also be made of a reflective, heat conducting material such as aluminum. The LEDs 220 may be comprised of a combination of side-emitting LEDs 210A and lambertian LEDs 210B, as illustrated in FIG. 3.

According to another alternate exemplary embodiment, the side-emitting LEDs 220A and lambertian LEDs 220B may comprise 5-watt LEDs (e.g., 5-watt Luxeons). For example, using 5-watt Luxeons in the design of FIG. 3, the anti-collision light 200 may be used to provide a horizontal coverage of 110 degrees. Such an embodiment satisfies the FAR specifications for wingtip installations and, thus, may be used on an aircraft in conjunction with an aft anti-collision light that provides the remaining 140 degrees of horizontal coverage.

What is claimed is:

1. An aircraft anti-collision light, comprising:
   a light module including
      two mounting surfaces angularly displaced from one another,
      a plurality of light-emitting diodes (LEDs) mounted onto each of the mounting surfaces, and
      a reflector block mounted onto each of the mounting surfaces, wherein a plurality of reflectors are integrally formed into each reflector block such that each of the reflectors is dedicated to and surrounds a particular one of the LEDs; and
   a housing operably connected to the light module, the housing being formed to be mounted to a wing or the aft of the aircraft,
   wherein the light module is configured to emit a pattern of light that satisfies a predetermined intensity over a coverage area greater than 110 degrees along a horizontal plane, and
   the peak intensity of light emitted by at least one of the plurality of LEDs is directed toward the corresponding reflector.

2. The anti-collision light of claim 1, wherein the contours of each of the reflectors is designed to redistribute the light from the corresponding LED so that the pattern of light satisfies the predetermined intensity in the coverage area.

3. The anti-collision light of claim 2, wherein
   the angular positions of the mounting surfaces gives each of LEDs a predetermined orientation with respect to the light module, and
   the orientations of the plurality of LEDs are designed in conjunction with the contours of the dedicated reflectors so that the pattern of light satisfies the predetermined intensity in the coverage area.

4. The anti-collision light of claim 2, wherein the contours of each of the reflectors is designed using computer-aided design (CAD) technology.

5. The anti-collision light of claim 1, further comprising cooling fins operably connected to the housing.

6. The anti-collision light of claim 5, further comprising one or more heat pipes configured to transfer heat from the mounting surfaces of the light module to the cooling fins.

7. The anti-collision light of claim 6, wherein the two mounting surfaces of the light module are part of at least one heat conducting mounting plate on which the plurality of LEDs are mounted, each of the mounting surfaces being operably connected to a corresponding one of the heat pipes to transfer heat from the mounting plate to the cooling fins.

8. The anti-collision light of claim 1, wherein the plurality of LEDs are grouped into strings of two or more LEDs electrically connected in series.

9. An anti-collision light, comprising:
   a light module including a plurality of light-emitting diodes (LEDs) and reflectors, each of the reflectors being dedicated to a particular one of the LEDs; and
   a housing operably connected to the light module, the housing being formed to be mounted to a wing or the aft of the aircraft,
   wherein
      the light module is configured to emit a pattern of light that satisfies a predetermined intensity over a coverage area greater than 110 degrees along a horizontal plane,
      the light emitted by at least one of the plurality of LEDs is substantially directed toward the corresponding reflector, and
      the plurality of LEDs are grouped into strings of two or more LEDs electrically connected in series,
   the anti-collision light further comprising monitor circuitry, which is configured to:
      monitor the operating status of the LEDs in each of the strings, and
      shut off the anti-collision light if a predetermined number of the LEDs in any of the strings fail.

10. The anti-collision light of claim 9, wherein
   the plurality of LEDs are grouped into two strings, and
   the monitor circuitry is configured to shut down the anti-collision light if two of the LEDs in any of the strings fail.

11. The anti-collision light of claim 9, wherein the monitor circuitry includes an LED sensing circuit for each string, which is configured to monitor potential voltage drops across the LEDs in the corresponding string.

12. The anti-collision light of claim 11, wherein the LED sensing circuit provides an alternative current path for the LEDs in the corresponding string in response to an LED failure.

13. The anti-collision light of claim 1, wherein the plurality of LEDs are controlled to flash at a rate which may be adjusted based on at least one of photometric and thermal requirements.

14. The anti-collision light of claim 1, wherein the plurality of LEDs include at least one side-emitting LED and at least one lambertian LED.

15. The anti-collision light of claim 1, wherein the plurality of LEDs include aviation white LEDs.

16. The anti-collision light of claim 15, wherein
the plurality of LEDs further include infrared (IR) LEDs, and
the anti-collision light is switchable between the following operating modes: a visible mode, and an IR mode.

17. A system comprising a plurality of the anti-collision lights of claim 15, wherein the plurality of the anti-collision lights are mounted on the same aircraft.

18. The system of claim 17, wherein the plurality of anti-collision lights satisfy the predetermined intensity 360 degrees along the horizontal plane.

19. An aircraft light, comprising:
a light module including
two mounting surfaces angularly displaced from one another,
a plurality of light-emitting diodes (LEDs) mounted onto each of the mounting surfaces, and
a reflector block mounted onto each of the mounting surfaces, wherein a plurality of reflectors are integrally formed into each reflector block such that each of the reflectors is dedicated to and surrounds a particular one of the LEDs;
a housing operably connected to the light module, the housing being formed to be mounted to a wing or the aft of the aircraft; and
heat pipes operably connecting each of the mounting surfaces, respectively, to the housing in order to transfer heat from the mounting surface to the housing,
wherein at least one of the plurality of LEDs is a side-emitting LED, such that the peak intensity of light emitted by the at least one of the plurality of LEDs is directed toward the corresponding reflector.

20. The aircraft light of claim 19, wherein
the aircraft light is configured to switchably operate in the following modes: a flashing aft anti-collision light mode, and a non-flashing aft position light mode, and
current is supplied to the LEDs based on the mode in which the aircraft light is operating.

21. The aircraft light of claim 1, wherein the at least one of the plurality of LEDs includes a side-emitting LED which emits light around its optical axis such that radiant intensity peaks in the range of 60-100 degrees off the optical axis.

22. The aircraft light of claim 19, wherein the side-emitting LED which emits light around its optical axis such that radiant intensity peaks in the range of 60-100 degrees off the optical axis.

* * * * *